March 12, 1957 J. R. V. OSWALD 2,785,227

METHOD AND DEVICE FOR MODULATION AND DEMODULATION FOR PULSE-TYPE TELECOMMUNICATION SYSTEM

Filed March 1, 1952 2 Sheets-Sheet 1

INVENTOR:

JACQUES RÉGIS VICTOR OSWALD

BY:

INVENTOR:
JACQUES RÉGIS VICTOR OSWALD
BY: Michael S. Striker agt

United States Patent Office 2,785,227

Patented Mar. 12, 1957

2,785,227

METHOD AND DEVICE FOR MODULATION AND DEMODULATION FOR PULSE-TYPE TELECOMMUNICATION SYSTEM

Jacques Regis Victor Oswald, Paris, France, assignor to Compagnie Industrielle des Telephones, Paris, France, a French corporation Application March 1, 1952, Serial No. 274,373

Claims priority, application France March 10, 1951

13 Claims. (Cl. 179—15)

Figure 1:
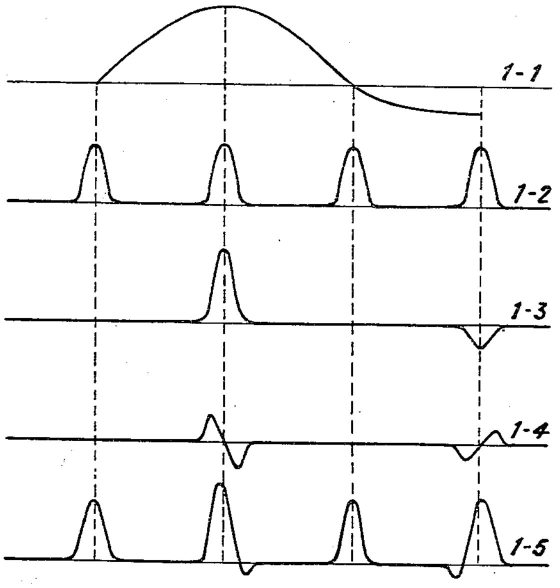

The present invention relates to a method of modulation and demodulation for pulse-type telecommunication system, employing the so-called "position" or "time shift" modulation and particularly for multiplex systems.

The principle employed in multiplex systems consists, as is well-known, in transmitting a series of impulses corresponding to the different channels, in the order of said channels, a special synchronising impulse fixing the period of repetition. The position modulation has the effect of causing a displacement of the impulse in relation to its reference position, which displacement is in proportion to the amplitude of the signal to be transmitted.

In the majority of known modulation systems, position-modulated impulses are obtained by differentiating duration-modulated impulses, for example by means of a condenser and a resistance. The duration-modulation is itself obtained from an amplitude-modulated impulse, which undergoes a suitable deformation by means of a time-constant device.

The method of modulation according to the invention makes it possible to obtain position-modulated impulses from amplitude-modulated impulses, without passing through the intermediate stage of time modulation.

The object of the present invention is a method of position modulation for a pulse-type telecommunication system, characterised in this, that the position modulation is obtained directly from an amplitude modulation, by addition to a first series of fixed impulses representing the original impulses before modulation, of a second series of impulses obtained by effecting the differentiation, in relation to time, of the first series of amplitude-modulated impulses.

The demodulation is obtained by addition to the series of position-modulated impulses of a seires of fixed impulses of opposite polarity, and by integration, in relation to time, of the signals obtained in this way.

The principle employed is the result of a mathematical expression indicated hereinafter:

Let an electrical impulse be of any form, capable of being represented by a continuous function of time $f(t)$ which has a differential coefficient for all values of $t$. Any series of $2p+1$ identical and equidistant impulses may be written:

$$y(t)=\sum_{k=-p}^{p} f(t-t_k)=\sum_{k=-p}^{p} f(t-kT)$$

designating by $t_k=kT$ the characteristic time unit of the $k^{th}$ impulse and by T the period of repetition.

Let $x(t)$ be any signal representing the modulation to be transmitted; in the time unit $t_k$, $x(t)$ has the value $x_k=x(t_k)$.

The amplitude modulation in pulses will cause the following series to correspond to $y(t)$:

$$y_a(t)=\sum_{-p}^{p} x_k f(t-t_k)$$

In position-modulation, it is the characteristic time-unit $t_k=kT$ which is modified in proportion to $x_k$ and becomes:

$$t_k'=t_k+\lambda T x_k=(k+\lambda x_k)T$$

$\lambda$ designating a constant factor, which may be called rate of modulation and which characterises the displacement to which the impulse is subejcted. We then have the series:

$$Z(t)=\sum_{k=-p}^{p} f(t-t_k')=\sum_{-p}^{p} f(t-t_k-\lambda T x_k)$$

In practice, in nearly all cases the maximum displacement undergone by the impulse $\lambda Tx_{max}$ is very slight in relation to the period of repetition T (for example 0.01 T or 0.02 T).

If we develop $z(t)$ in Taylor series, only keeping the terms of the first order we get:

$$Z(t)=\sum_{-p}^{p} f(t-t_k-\lambda T x_k)=$$

$$\sum_{-p}^{p} f(t-t_k)-\lambda T\sum_{-p}^{p} x_k\left(\frac{df}{dt}\right)_{t-t_k}=$$

$$\sum_{-p}^{p} f(t-t_k)-\lambda T\frac{d}{dt}\left[\sum_{-p}^{p} x_k f(t-t_k)\right]$$

$$Z(t)=y(t)-\lambda T\frac{d}{dt}ya(t)$$

The result may be expressed in this way:

A series of position-modulated impulses, with a displacement which is slight in relation to the period of repetition, may be considered as the sum of two terms: the first term represents the series of unmodulated impulses, the second is in proportion to the derivative in relation to time of the series of the same impulses preliminarily modulated in amplitude.

From this result it is possible to infer the method of modulation and demodulation which is characteristic of the invention:

For the modulation, a series of fixed impulses is used, which take two paths. In the first they are modulated in amplitude, then differentiated in relation to time. In the second path they are not subjected to alteration. The ends of the two paths are interconnected so as to bring about the superposition of the two series of signals, which supplies a series of position-modulated impulses.

For the demodulation, the reverse procedure is adopted: the series of position-modulated impulses is mixed with a series of fixed impulses, obtained from the synchronizing impulses, the polarities being opposite. Then we integrate the series of impulses obtained, considered as a function of time, which supplies a series modulated either in amplitude or in duration. In either case, the restoration of the modulation signal is effected, as is well known, by a simple filtering by a low pass filter.

Fig. 1 represents the transformations undergone by the impulses in the process of modulation. 1.1 is the low-frequency signal to be transmitted, 1.2 the series of unmodulated impulses, separated by the interval T. The product of these impulses by the signal 1.1 supplies the amplitude-modulated impulses 1.3 of which the differentiation in relation to time is represented by the series 1.4. The superposition of 1.2 and 1.4 gives the series 1.5, which is obviously modulated in position. In this method, there exists a parasitic amplitude modulation which is easily eliminated by suitable limiting.

Figure 2:
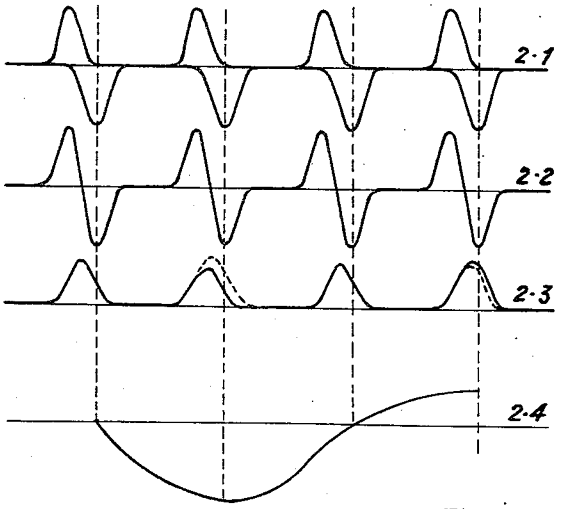

Fig. 2 represents the process of demodulation. The positive impulses of series 2.1 are the fixed reference impulses which are generated from the synchronising impulses: the negative impulses of this same series are the position-modulated channel impulses. The sum of these impulses supplies the series 2.2, the integration of (2.2) the series (2.3) which is modulated in amplitude and in duration. It is possible by limiting or by suitable selection to obtain impulses modulated only in duration or only in amplitude. This operation, however, is unnecessary, because the spectrum of the modulation signal is present in the series (2.3) so that a simple filtering by low-pass filter will restore the signal (2.4) identical with (1.1).

It may be noted that the series (2.2) is already a series of duration-modulated impulses, but the integration makes it possible to disregard, to a certain extent the relative position of the two series of impulses of the series (2.1). In effect, in the case in which the positive and negative impulses do not interfere, the integration supplies impulses modulated in duration, while the direct demodulation from (2.2) is not possible at least without a considerable distortion. Moreover, the demodulation process is exactly reciprocal to the modulation process.

One of the advantages of the method of modulation and demodulation which is the object of the invention is its independence with respect to the characteristics of the electronic tubes. In effect, the operations of differentiation and integration are effected solely by means of passive networks, comprising inductances, capacities and resistances; it is not necessary to introduce valves having a well-defined polarisation as in the majority of the known arrangements.

Figure 3:
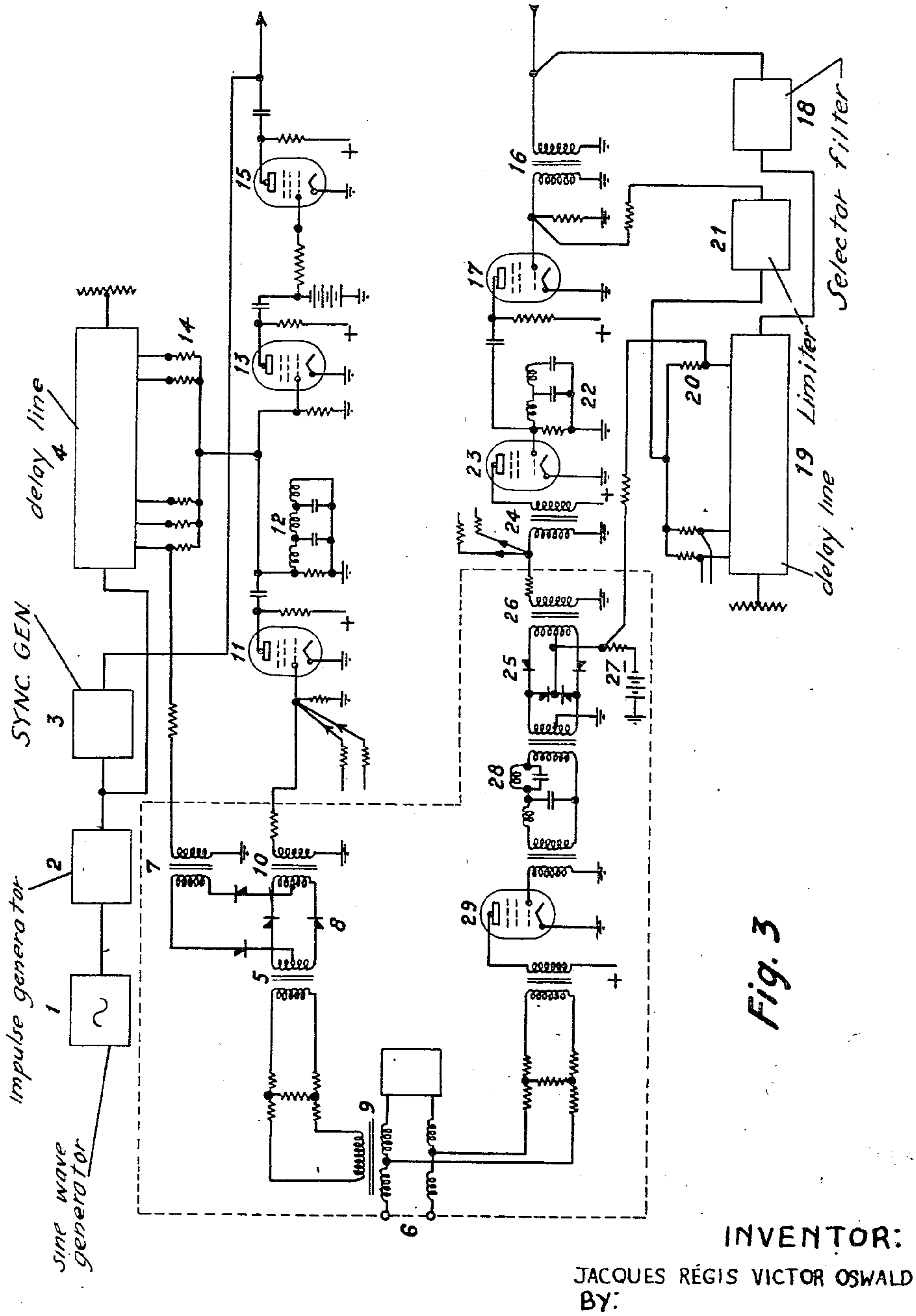

Fig. 3 gives, as a non-limitative example, a basic diagram making it possible to realise in a multiplex system the modulation and demodulation operations which have just been described. In this drawing, the portion frame *d* in discontinuous lines, represents the members belonging to one channel, while the portion outside this frame represents the members common to the whole of the channels. In this figure 1 represents a generator of sinusoidal oscillations from which an impulse generator 2 supplies a series of impulses of repetition period T. This series energises on the one hand a generator 3 of pilot synchronising impulses, on the other hand a retardation line 4 on the tappings of which we take the impulses allotted to the various channels. The channel impulse is applied through a transformer 7 to a balanced modulator 8 comprising for example rectifier cells and supplying an amplitude modulation without carrier wave.

The voice currents coming from a line 6 are applied to the input transformer 5 of the channel modulator 8 by means of a balanced differential transformer (hybrid coil) 9. A transformer 10 supplies amplitude modulated impulses without carrier wave, the elimination of the carrier wave, although not necessary is desirable in order to obtain the maximum rate of modulation, and the mixture of impulses supplied by the various channels is effected on the control grid of a valve 11. The assembly of these impulses is differentiated by means of a short-circuited retardation line 12 (or by means of a suitable capacity-resistance system). A valve 13 receives the whole of the differentiated impulses on the one hand, the whole of the fixed impulses coming from the retardation line on the other hand; the coupling being effected through mixer resistances 14. A valve 15 limits the impulses obtained which are then mixed with the synchronising impulse on the output of the device.

At the receiving end, the received impulses are sent with suitable polarity by means of a transformer 16 on the grid of a valve 17. A selector 18 isolates the synchronising impulse which is sent on a retardation line 19 to produce the fixed channel selection impulses. These impulses are also mixed through resistances 20 then brought back if necessary to the suitable amplitude by a device 21 (limiter or potentiometer) before being applied to the grid of the valve 17. A retardation line in open circuit 22 (or any other device with capacity-resistance or inductance-resistance) integrates the signals supplied by the valve 17 and an amplifier 23 applies, by means of a transformer 24, the integrated signals to the different channels placed in parallel. A suitable selector 25 (for example a blocking selector with rectifier cells) selects the channel impulse when the whole of the integrated signals is applied to it via a transformer 26 and the selection impulse corresponding to the channel is applied to a resistance 27 from the retardation line 19. The selected impulse is demodulated by a low-pass-filter 28 and the voice currents amplified by a valve 29 are applied to the termination 9 of the two-wire line 6.

What is claimed is:

1. A receiving system for reception of position modulated electrical current impulses along with electrical current pilot synchronizing impulses comprising in combination, receiver input means for receiving transmitted position modulated electrical current impulses along with electrical current pilot synchronizing pulses; a filter network connected to said receiver input means for separating the electrical current pilot synchronizing pulses from said position modulated electrical current impulses; a mixer circuit having first, second and output terminal means, said mixer circuit being electrically connected at said first terminal means thereof to the output of said filter network, and said position modulated electrical current impulses received by said receiver input means being electrically connected to said second terminal means of said mixer circuit; an integrating circuit electrically connected to said output terminal means of said mixer circuit; a low pass filter electrically connected to the output of said integrating circuit, said low pass filter passing only voice current frequencies; and receiver means connected to the output of said low pass filter for changing the voice currents to audible voice frequencies.

2. A receiving system for reception of position modulated electrical current impulses along with electrical pilot synchronizing impulses comprising in combination, receiver input means for receiving transmitted position modulated electrical current impulses along with electrical current pilot synchronizing pulses; a filter network connected to said receiver input means for separating the electrical current pilot synchronizing pulses from said position modulated electrical current impulses, said pilot synchronizing current pulses being represented by a continuous function of time, $f(t)$, which has a differential coefficient for all values of $t$; a mixer circuit having first, second and output terminal means, said mixer circuit being electrically connected at said first terminal means thereof to the output of said filter network, and said position modulated electrical current impulses received by said receiver input means being electrically connected to said second terminal means of said mixer circuit; an integrating circuit electrically connected to said output terminal means of said mixer circuit; a low pass filter electrically connected to the output of said integrating circuit, said low pass filter passing only voice current frequencies; and receiver means connected to the output of said low pass filter for changing the voice currents to audible voice frequencies.

3. A receiver for use with a telecommunication system wherein position modulated electrical current impulses are transmitted together with synchroniing impulses comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing circuit having a plurality of input terminals and at least one output terminal, one of said input terminals of said mixing circuit being connected to said output terminals of said separating means, another of said input terminals of said mixing circuit being adapted to receive the position modulated impulses from said input means; integrating means connected to the output terminals of said mixing circuit for integrating the mixed impulse output thereof; and means for eliminating the high frequency components of the integrated output of said integrating means to obtain the original audio frequency signals.

4. A receiver for use with a telecommunication system wherein position modulated electrical current impulses are transmitted together with synchronizing impulses comprising, in combination, an input transformer having a primary and a secondary winding, said primary winding being adapted to receive the transmitted position modulated impulses together with the synchronizing impulses; separating means connected to the primary winding of said input transformer for separating the synchronizing impulses from the position modulated impulses, said separating means having output terminals; a mixing circuit having a plurality of input terminals and at least one output terminal, one of said input terminals of said mixing circuit being connected to said output terminals of said separating means, another of said input terminals of said mixing circuit being connected to said secondary winding of said input transformer to receive the position modulated impulses therefrom; integrating means connected to the output terminals of said mixing circuit for integrating the mixed impulse output thereof; and means for eliminating the high frequency components of the integrated output of said integrating means to obtain the original audio frequency signals.

5. A receiver for use with a telecommunication system wherein position modulated electrical current impulses are transmitted together with synchronizing impulses comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing circuit having a plurality of input terminals and at least one output terminal, one of said input terminals of said mixing circuit being connected to said output terminals of said separating means, another of said input terminals of said mixing circuit being adapted to receive the position modulated impulses from said input means; integrating means connected to the output terminals of said mixing circuit for intergating the mixed impulse output thereof, said integrating means including an open crcuited delay line; and means for eliminating the high frequency components of the integrated output of said integrating means to obtain the original audio frequency signals.

6. A receiver for use with a telecommunication system wherein position modulated electrical current impulses are transmitted together with synchronizing impulses, comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing tube having at least a control electrode and an anode, said control grid being connected to the output of said input means to receive the position modulated impulses therefrom, said control grid also being connected to the output terminals of said separating means whereby the impulses applied to said control electrode are mixed in said mixing tube and appear at the anode thereof; integrating means connected to the anode of said mixing tube for integrating the mixed impulse output thereof; and means for eliminating the high frequency components of the integrated output of said integrating means to obtain the original audio frequency signals.

7. A receiver for use with a telecommunication system wherein position modulated electrical current impulses are transmitted together with synchronizing impulses comprising, in combination, an input transformer having a primary and a secondary winding, said primary winding being adapted to receive the transmitted position modulated impulses together with the synchronizing impulses; separating means connected to the primary winding of said input transformer for separating the synchronizing impulses from the position modulated impulses, said separating means having output terminals; a mixing tube having at least a control electrode and an anode, said control grid being connected to the secondary winding of said input transformer to receive the position modulated impulses therefrom, said control grid also being connected to the output terminals of said separating means whereby the impulses applied to said control electrode are mixed in said mixing tube and appear at the anode thereof; integrating means connected to the anode of said mixing tube for integrating the mixed impulse output thereof; and means for eliminating the high frequency components of the integrated output of said integrating means to obtain the original audio frequency signals.

8. A receiver for use with a telecommunication system wherein position modulated electrical current impulses are transmitted together with synchronizing impulses comprising, in combination, an input transformer having a primary and a secondary winding, said primary winding being adapted to receive the transmitted position modulated impulses together with the synchronizing impulses; separating means connected to the primary winding of said input transformer for separating the synchronizing impulses from the position modulated impulses, said separating means having output terminals; a mixing circuit having a plurality of input terminals and at least one output terminal, one of said input terminals of said mixing circuit being connected to said output terminals of said separating means, another of said input terminals of said mixing circuit being connected to said secondary winding of said input transformer to receive the position modulated impulses therefrom; integrating means connected to the output terminals of said mixing circuit for integrating the mixed impulse output thereof, said integrating means including an open circuited delay line; and means for eliminating the high frequency components of the integrated output of said integrating means to obtain the original audio frequency signals.

9. A receiver for use with a telecommunication system wherein position modulated electrical current impulses are transmitted together with synchronizing impulses comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing tube having at least a control electrode and an anode, said control grid being connected to the output of said input means to receive the position modulated impulses therefrom, said control grid also being connected to the output terminals of said separating means whereby the impulses applied to said control electrode are mixed in said mixing tube and appear at the anode thereof; integrating means connected to the anode of said mixing tube for integrating the mixed impulse output thereof, said integrating means including an open circuited delay line; and means for eliminating the high frequency components of the integrated output of said integrating means to obtain the original audio frequency signals.

10. A receiver for use with a telecommunication system wherein position modulated electrical current impulses are transmitted together with synchronizing impulses comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing tube having at least a control electrode and an anode, said control grid being connected to the secondary winding of said input transformer to receive the position modulated impulses therefrom, said control grid also being connected to the output terminals of said separating means whereby the impulses applied to said control electrode are mixed in said mixing tube and appear at the anode thereof; integrating means connected to the anode of said mixing tube for integrating the mixed impulse output thereof, said integrating means including an open circuited delay line; and means for eliminating the high frequency components of the integrated output of said integrating means to obtain the original audio frequency signals.

11. A receiver for use with a telecommunication system wherein position modulated electrical current impulses are transmitted together with synchronizing impulses comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing circuit having a plurality of input terminals and at least one output terminal, one of said input terminals of said mixing circuit being connected to said output terminals of said separating means, another of said input terminals of said mixing circuit being adapted to receive the position modulated impulses from said input means; integrating means connected to the output terminals of said mixing circuit for integrating the mixed impulse output thereof; and a low pass filter connected to the output of said integrating means for eliminating the high frequency components of the integrated output of said integrating means to obtain the original audio frequency signals.

12. A receiver for use with a telecommunication system wherein position modulated electrical current impulses are transmitted together with synchronizing impulses comprising, in combination, an input transformer having a primary and a secondary winding, said primary winding being adapted to receive the transmitted position modulated impulses together with the synchronizing impulses; separating means connected to the primary winding of said input transformer for separating the synchronizing impulses from the position modulated impulses, said separating means having output terminals;

a mixing circuit having a plurality of input terminals and at least one output terminal, one of said input terminals of said mixing circuit being connected to said output terminals of said separating means, another of said input terminals of said mixing circuit being connected to said secondary winding of said input transformer to receive the position modulated impulses therefrom; integrating means connected to the output terminals of said mixing circuit for integrating the mixed impulse output thereof; and a low pass filter connected to the output of said integrating means for eliminating the high frequency components of the integrated output of said integrating means to obtain the original audio frequency signals.

13. A receiver for use with a telecommunication system wehrein position modulated electrical current impulses are transmitted together with synchronizing impulses comprising, in combination, input means having input terminals adapted to receive the transmitted position modulated impulses together with the synchronizing impulses; separating means connected to the input terminals of said input means for separating the synchronizing impulses from the position modulated impulses, said separating means having output terminals; a mixing circuit having a plurality of input terminals and at least one output terminal, one of said input terminals of said mixing circuit being connected to said output terminals of said separating means, another of said input terminals of said mixing circuit being adapted to receive the position modulated impulses from said input means; integrating means connected to the output terminals of said mixing circuit for integrating the mixed impulse output thereof, said integrating means including an open circuited delay line; and a low pass filter connected to the output of said integrating means for eliminating the high frequency components of the integrated output of said integrating means to obtain the original audio frequency signals.

References Cited in the file of this patent

UNITED STATES PATENTS

| | | |
|---|---|---|
| 2,266,401 | Reeves | Dec. 16, 1941 |
| 2,445,783 | Labin | July 27, 1948 |
| 2,447,233 | Chatterjea | Aug. 17, 1948 |
| 2,478,919 | Hansell | Aug. 16, 1949 |
| 2,495,168 | Houghton | Jan. 17, 1950 |
| 2,510,987 | Levy | June 13, 1950 |
| 2,523,279 | Chatterjea et al. | Sept. 29, 1950 |